(12) United States Patent
Gainer

(10) Patent No.: US 6,877,934 B2
(45) Date of Patent: Apr. 12, 2005

(54) MILLING HEAD FOR THREAD WHIRLING

(75) Inventor: Ronald John Gainer, Winsted, CT (US)

(73) Assignee: REM Sales, Inc., East Granby, CT (US)

( * ) Notice: Subject to any disclaimer, the term of this patent is extended or adjusted under 35 U.S.C. 154(b) by 0 days.

(21) Appl. No.: 10/306,124

(22) Filed: Nov. 27, 2002

(65) Prior Publication Data

US 2004/0081519 A1 Apr. 29, 2004

Related U.S. Application Data

(60) Provisional application No. 60/421,875, filed on Oct. 28, 2002.

(51) Int. Cl.$^7$ .............................. B23C 5/22; B23G 1/34
(52) U.S. Cl. ............................ 407/49; 409/113; 409/74
(58) Field of Search .............................. 407/24, 25, 31, 407/49, 55, 56, 60, 61; 82/110, 117, 130; 409/65, 71, 74, 76, 77, 199; B23G 1/34, 5/18

(56) References Cited

U.S. PATENT DOCUMENTS

| 270,408 A | 1/1883 | Forbes |
| 1,415,339 A | 1/1922 | Hall |
| 1,464,779 A | 8/1923 | Shearman |

(Continued)

FOREIGN PATENT DOCUMENTS

| DE | 35 32 282 | 3/1987 | |
| DE | 3721732 A | * 1/1989 | .............. B23C/7/00 |
| DE | 10143299 C1 | * 5/2003 | .............. B23C/5/24 |

OTHER PUBLICATIONS

Leo Rakowski; "Putting More Teeth in Thread Whirling"; Production Machining; Jan./Feb. 2004.

Primary Examiner—A. L. Wellington
Assistant Examiner—Dana Ross
(74) Attorney, Agent, or Firm—Cantor Colburn LLP

(57) ABSTRACT

A milling head for thread whirling, the milling head includes a plurality of cutting elements evenly disposed around a center hole, each cutting element in the plurality of cutting elements includes at least two cutting surfaces formed thereon. Any one of the at least two cutting surfaces is selectable to extend within the center hole for contacting a work-piece. Each cutting element in the plurality of cutting elements is disposed in a recess formed in a face of the milling head, with each recess defining at least two walls. Each of the at least two walls contacts a side of the cutting element to align the cutting element in a predetermined relationship with respect to the milling head. In one embodiment, the plurality of cutting elements include first and second sets of cutting elements. The first set of cutting elements is evenly disposed around the center hole and contact the work-piece to produce a thread form on the work-piece. The second set of cutting elements is evenly disposed around the center hole and contacts the work-piece to remove material proximate the outside diameter of the work-piece.

12 Claims, 5 Drawing Sheets

U.S. PATENT DOCUMENTS

| | | | |
|---|---|---|---|
| 1,507,235 A | 9/1924 | Hall | |
| RE15,953 E | 11/1924 | Beck | |
| 1,705,240 A | 3/1929 | Devine | |
| 1,886,942 A | 11/1932 | Czemba | |
| 1,888,792 A | 11/1932 | Cottrell | |
| 1,978,427 A | 10/1934 | Hogg | |
| 2,549,381 A | 4/1951 | Matica | |
| 2,629,886 A | 3/1953 | Halligan | |
| 2,644,224 A | 7/1953 | Chilcott et al. | |
| 2,691,921 A | 10/1954 | Burgsmuller | |
| 2,713,282 A | 7/1955 | Burgsmuller | |
| 2,739,510 A | 3/1956 | Burgsmuller | |
| 2,749,807 A | 6/1956 | Burgsmuller | |
| 2,749,808 A | 6/1956 | Burgsmuller | |
| 2,804,142 A | 8/1957 | Becker et al. | |
| 2,966,968 A | 1/1961 | Skeel | |
| 3,209,652 A | 10/1965 | Burgsmueller | |
| 3,341,921 A | 9/1967 | Weller et al. | |
| 3,341,923 A | 9/1967 | Kelm | |
| 3,540,102 A | 11/1970 | Yogus et al. | |
| 3,613,197 A | 10/1971 | Steir | |
| 3,672,016 A | 6/1972 | Melinder | |
| 3,708,843 A | 1/1973 | Erkfritz | |
| 3,787,941 A | 1/1974 | Novkov | |
| 3,812,547 A | 5/1974 | Reich | |
| 3,829,920 A | 8/1974 | Theuerkauf | |
| RE28,389 E | 4/1975 | Melinder | |
| 4,063,837 A | 12/1977 | Ditson | |
| 4,269,244 A | 5/1981 | Kinsella | |
| 4,278,374 A | 7/1981 | Wolosianski | |
| 4,281,430 A | 8/1981 | Hellnick | |
| 4,311,418 A * | 1/1982 | Erkfritz et al. | 407/39 |
| 4,449,864 A | 5/1984 | Hague et al. | |
| 4,464,085 A * | 8/1984 | Kalokhe | 407/105 |
| 4,575,888 A | 3/1986 | Muren | |
| 4,669,925 A | 6/1987 | Lowe et al. | |
| 4,797,039 A | 1/1989 | Bosek | |
| 4,831,906 A | 5/1989 | Sugimoto et al. | 82/118 |
| 5,158,404 A | 10/1992 | Samas et al. | |
| 5,230,590 A * | 7/1993 | Bohannan et al. | 407/113 |
| 5,238,337 A | 8/1993 | Nussbaumer et al. | 409/132 |
| 5,429,459 A | 7/1995 | Palm | |
| 5,868,051 A | 2/1999 | Pakos | |
| 5,964,552 A * | 10/1999 | Larsen | 407/113 |
| 6,049,965 A | 4/2000 | Perkins, Jr. | |
| 6,138,540 A * | 10/2000 | Niemi | 82/1.11 |
| 6,290,436 B1 | 9/2001 | Qvarth | |
| D481,046 S * | 10/2003 | Gainer | D15/139 |

* cited by examiner

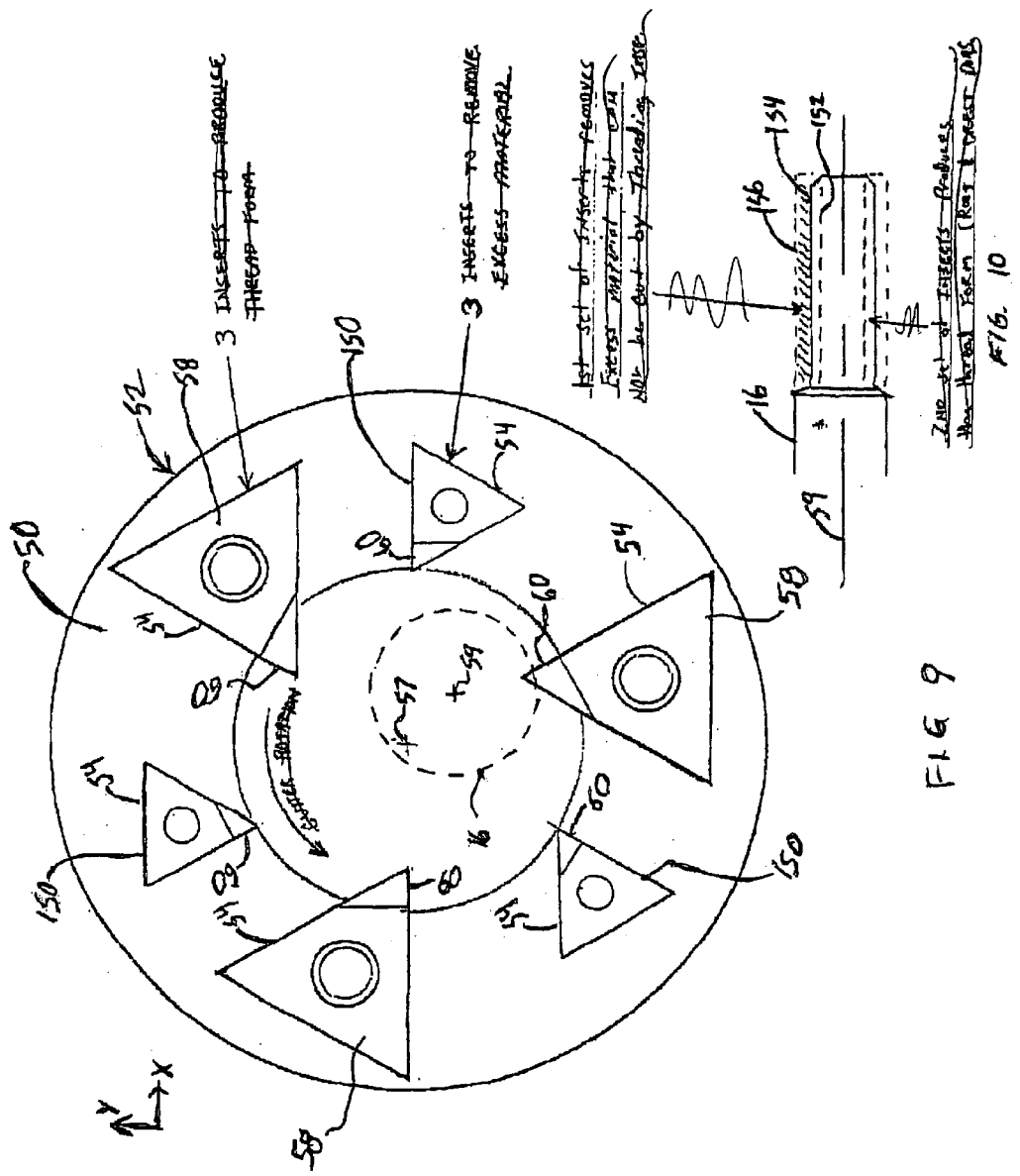

MILLING HEAD FOR THREAD WHIRLING

CROSS REFERENCE TO RELATED APPLICATIONS

This application claims the benefit of U.S. Provisional Application Ser. No. 60/421,875, filed Oct. 28, 2002, which is incorporated by reference in its entirety.

BACKGROUND

The present invention relates to the machining of threads and, more particularly, to the machining of threads by thread whirling.

Thread whirling is a cutting process performed on a lathe, milling machine, or dedicated thread whirling machine, in which a thread is produced on the outside diameter of metallic or non-metallic material (work-piece). The shape to be imposed is produced by cutting elements (tools) mounted within a hollow milling head (tool holder ring), which rotates around the outside diameter of the work-piece. The work-piece may be rotated in the same direction as the milling head and at a relatively lower speed. The axis of rotation of the work-piece is offset from the axis of rotation of the milling head, and the axis of rotation of the milling head is tilted at the desired helix angle of the thread. The work-piece is fed along its axis of rotation through the milling head, or the milling head moves along the axis of rotation of the work-piece. The work-piece is fed, or the milling head is moved, at the desired lead of the thread (i.e., the desired distance from the root of one thread to the root of the next thread). The cutting elements have cutting surfaces that successively and tangentially contact the work-piece as the milling head orbits around the work piece.

With thread whirling, screws can be machined as much as four times faster than other thread methods, with a much superior surface finish. Additionally, in comparison to a single point thread cutting method, there is no pre-shaping of the material required, the length of the part to be cut is not limited, and tool life is substantially increased.

One example of a thread whirling machine is provided in U.S. Pat. No. 4,278,374. In this whirling machine, a plurality of cutting elements is disposed in a milling head (tool holder ring). Adjustments in the relative positions of the cutting elements with respect to the tool holder ring and work-piece are carried out by bolts on the cutting element. The heads of the bolts bear against an inner wall of the cavities in the tool holder ring in which the cutting elements are disposed and the bolts are extended or retracted to adjust the position of the cutting elements.

Another example of a thread whirling milling head is shown in FIG. 1. The milling head 10 of FIG. 1 has a face 11, onto which three circular cutting elements 12 are secured. Each of the circular cutting elements 12 include a cutting surface 14 formed thereon, which extends radially from the center of the circular cutting element 12. The cutting surfaces 14 contact a work-piece 16 as the work-piece 16 and milling head 10 rotate, forming threads into the outside diameter of the work-piece 16. If the cutting surfaces 14 become dull, they are reground to form new cutting surfaces 14', and the work-piece 16 is rotated such that the new cutting surfaces 14' are in a proper cutting position (e.g., in the proper cutting height and rake angle) relative to the milling head 10. The circular shape of the cutting elements 12 provides for good tool strength and makes regrinding easy. However, setting the circular cutting elements 12 in proper cutting position in the milling head 10 is a difficult and a time consuming process that requires special tools such as a setting gauge, a setting jig, and a knock out device.

SUMMARY OF THE INVENTION

The above discussed and other drawbacks and deficiencies of the prior art are overcome or alleviated by a milling head for thread whirling, the milling head includes a plurality of cutting elements evenly disposed around a center hole, each cutting element in the plurality of cutting elements includes at least two cutting surfaces formed thereon. Any one of the at least two cutting surfaces is selectable to extend within the center hole for contacting a work-piece.

In another aspect of the invention, each cutting element in the plurality of cutting elements is aligned in a predetermined relationship with respect to the milling head by at least two walls contacting sides of the cutting element. The predetermined relationship may include a cutting height and a rake angle.

In another aspect of the invention, the plurality of cutting elements include first and second sets of cutting elements. The first set of cutting elements is evenly disposed around the center hole and contact the work-piece to produce a thread form on the work-piece. The second set of cutting elements is evenly disposed around the center hole and contacts the work-piece to remove material proximate the outside diameter of the work-piece.

BRIEF DESCRIPTION OF THE DRAWINGS

Referring to the exemplary drawings wherein like elements are numbered alike in the several Figures:

FIG. 9 is a plan view of another alternative face of a milling head including additional cutting elements; and FIG. 10 is an elevation view of a portion of a work piece machined by the milling head of FIG. 9.

DETAILED DESCRIPTION

Figure 1:
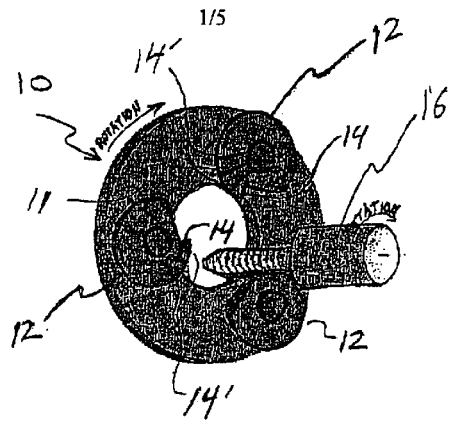
FIG. 1 is a perspective view of a milling head with circular cutting elements of the prior art.
Figure 2:
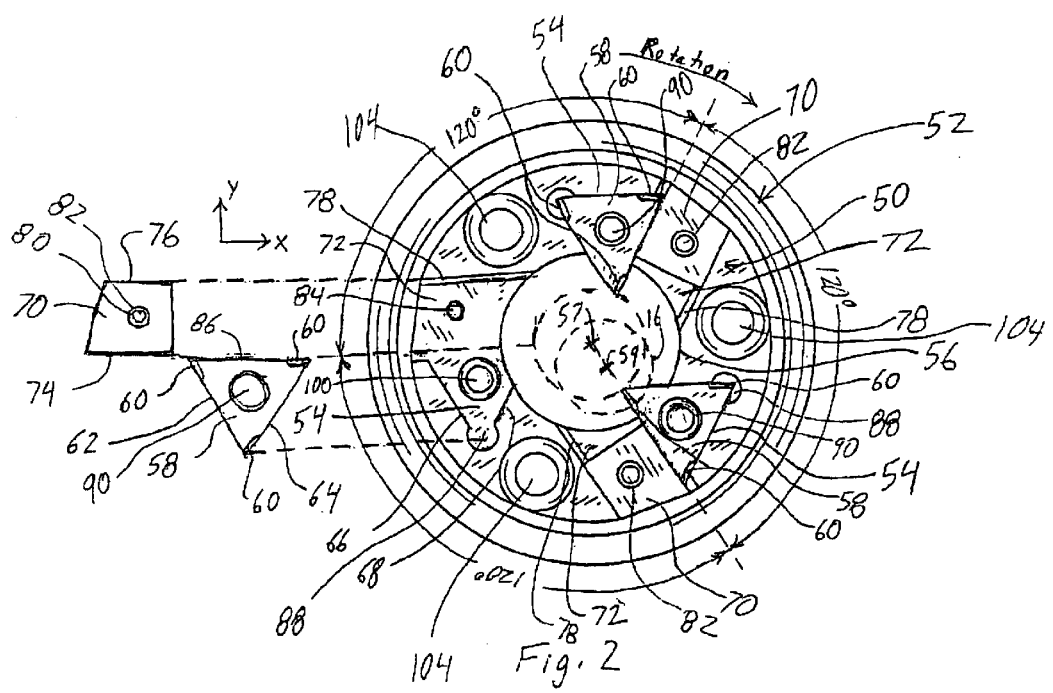
FIG. 2 is a partially exploded plan view of a face of a milling head including triangular cutting elements.

Referring to FIG. 2, a face 50 formed on a hollow milling head 52 for thread whirling is shown. Face 50 includes a series of recesses 54 formed thereon and evenly spaced around a center hole 56. Center hole 56 is centered at the axis of rotation 57 of the milling head 52 to accommodate the work-piece 16, which has an axis of rotation as indicated at 59. Disposed within each recess 54 is a removable cutting element 58. In the embodiment illustrated, three recesses 54 and three cutting elements 58 are shown, but there may be provided more or less recesses 54 and cutting elements 58 if desired. Each cutting element 58 includes a plurality of interchangeable cutting surfaces 60 formed thereon, and sides 62 and 64 of each cutting element 58 contact walls 66 and 68 of the recess 54 to align one of the cutting surfaces 60 in a desired cutting position with respect to the hollow milling head 52. In the embodiment shown, each cutting element 30 is triangular in shape. However, any convenient geometric shape may be used.

Figure 3:
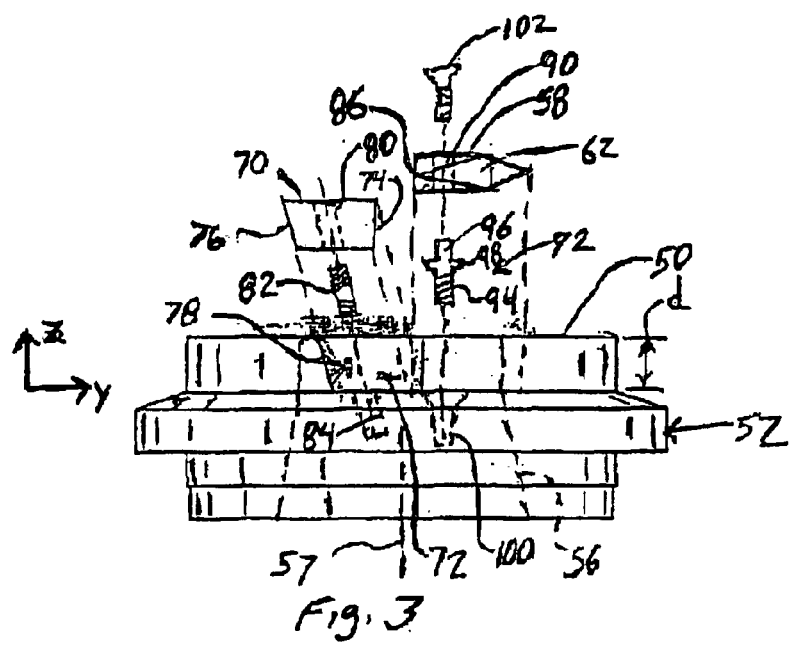
FIG. 3 is a partially exploded elevation view of the milling head of FIG. 2.

Referring to FIGS. 2 and 3, each cutting element 58 is secured in the recess 54 using a locking wedge 70, which is received in a slot 72 formed on face 50. Slot 72 is contiguous with one side of the recess 54. Locking wedge 70 includes a side 74 contacting the cutting element 58 and an opposite side 76 contacting an angled wall 78 formed by the slot 72 in the milling head 52. A threaded hole 80 disposed through a center of locking wedge 70 receives a bolt, screw, or the like (hereinafter "threaded fastener") 82. Threaded fastener 82 is also received in a threaded hole 84 disposed in milling head 52 to secure the locking wedge 70 in the slot 72. In the embodiment shown, both holes 80 and 84 are threaded in opposite directions (e.g. hole 80 has a left hand thread and hole 84 has a right hand thread). Similarly, the ends of threaded fastener 82 are threaded in opposite directions to match the thread of the corresponding hole 80 and 84. With this arrangement, assembly of the locking wedge 70 onto the milling head 52 is accomplished by placing threaded fastener 82 between locking wedge 70 and milling head 52, aligning the fastener 82 with holes 80 and 80 and 84, and rotating the fastener 82 in a first direction (e.g., counterclockwise). Rotation of the threaded fastener 82 in the first direction draws the locking wedge 70 into the slot 72. Threaded fastener 82, holes 80 and 84, side of locking wedge 76, and wall 78 formed by slot 72 are all angled towards cutting element 58. Thus, as threaded fastener 82 is tightened, locking wedge 70 moves towards cutting element 58, contacts a side 86 of cutting element 58, and forces sides 62, 64 of cutting element into contact with walls 66 and 68 defined by recess 54. The force of locking wedge 70 on side 86, wedges cutting element 58 in place between walls 66 and 68. Advantageously, the use of locking wedge 70 to secure cutting element 58 within recess 54 ensures that cutting element 58 is in contact with walls 66 and 68, which, as will be described in further detail hereinafter, ensures that cutting element 58 is properly aligned with milling head 52. Walls 66 and 68 are separated by a semi-circular portion 88 of recess 54, which provides an open area for receiving, and thus preventing damage to, the cutting surface 60 on side 64 of cutting element 58.

Removal of locking wedge 70 is accomplished by rotation of the threaded fastener 82 in a second direction opposite the first direction (e.g., clockwise), which causes threaded fastener 82 to force the locking wedge 70 away from the milling head 52. As a result, locking wedge 70 can be removed from the milling head 52 without the need for prying and without the use of special tools. It will be appreciated, however, that locking wedge 70 can be held in place by a threaded fastener (not shown) having only a single thread direction. In this embodiment, holes 80 and 84 would be threaded in the same direction to match the thread of threaded fastener, or hole 80 would be unthreaded and the threaded fastener would have a head to retain locking wedge 70 in slot 72.

Each cutting element 58 has three sides 62, 64 and 86, with a cutting surface 60 formed on each of the three sides. Disposed through the center of cutting element 58 is a hole 90, which, in the embodiment shown, receives a cutting element removal pin 92 that is threadably secured within a hole 94 disposed in the milling head 52. Each cutting element 58 is symmetrical with respect to each of its cutting surfaces 60, thus allowing the cutting element 58 to be mounted in the recess 54 to utilize any of the cutting surfaces 60 when one should wear out. For example, when the cutting surface 60 on side 86 wears out, the cutting element 58 can be rotated such that the cutting surface 60 on either side 62 or 64 extend into center hole 56 and perform the cutting operation on the work-piece 16.

Figure 4:
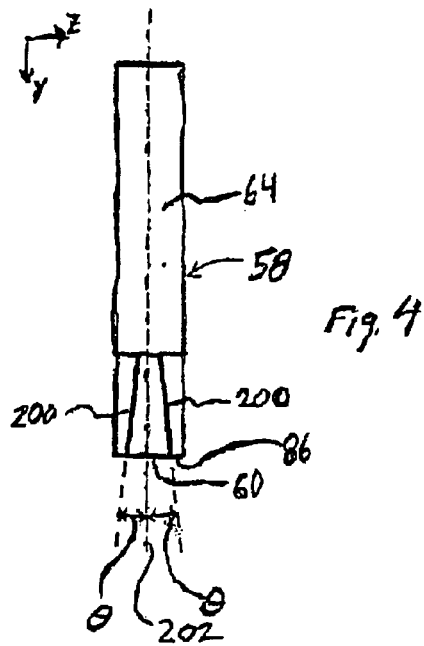
FIG. 4 is a top view of a cutting surface on the triangular cutting element of FIG. 3.
Figure 5:
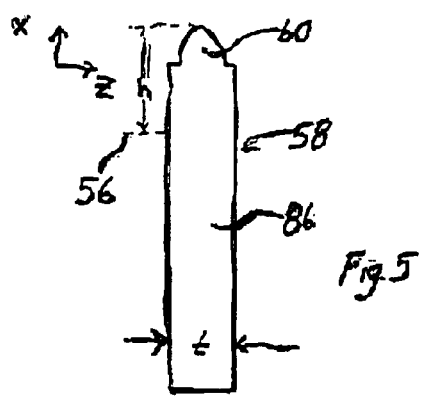
FIG. 5 is a front view of the cutting surface of FIG. 4.
Figure 6:
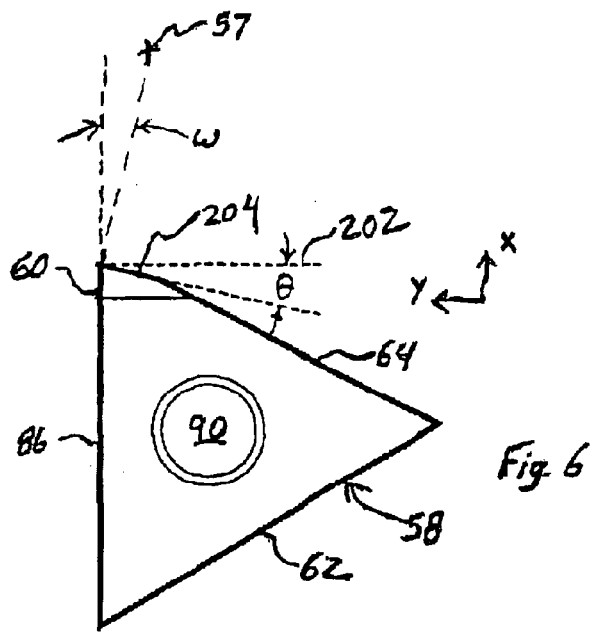
FIG. 6 is a side view of the cutting surface of FIG. 4.

Referring to FIGS. 4–6, top, front, and side views of cutting element 58 are shown, respectively. For clarity in FIGS. 4–6, only the cutting surface 60 formed on side 86 is shown. It will be appreciated that cutting surfaces 60 may be formed on sides 62 and 64 as well. Each cutting surface 60 is shaped according to the desired thread shape, which in this example is a semi-circular shape as shown in FIG. 5. As shown in FIG. 4, extending from the cutting surface 60 are trailing side surfaces 200, which are adjacent to the cutting surface 60 and extend at a predetermined clearance angle θ in the y-z plane shown from a line 202 normal to cutting surface 60. Also adjacent to the cutting surface 60 is a trailing top surface 204, which is shown in FIG. 6. Trailing top surface 204 extends from cutting surface 60 at predetermined clearance angle θ, in the x-y plane shown, from line 202. In the embodiment shown, both trailing side surfaces 200 and trailing top surface 204 extend from the cutting surface 60 at the same clearance angle θ; however, the clearance angle θ for each trailing side surface 200 and for trailing top surface 204 may be different. Preferably, the clearance angle θ for each of these surfaces 200 and 204 is greater than two degrees. More preferably, the clearance angle θ for each of these surfaces 200 and 204 is greater than three degrees. Also, the clearance angle θ for each of these surfaces 200 and 204 is preferably less than eight degrees, and, more preferably, the clearance angle θ is less than five degrees.

Referring again to FIG. 3, removal pin 92 includes a threaded portion 94, an unthreaded portion 96, and a flange 98 disposed between the unthreaded and threaded portions 94 and 96. Threaded portion 94 is received in a threaded hole 100 disposed in milling head 52, with collar 98 being received in a chamfered portion of the hole 100 such that the bottom surface of cutting element rests on the bottom of recess 54 when cutting element 58 is disposed in recess 54. Unthreaded portion 96 is received in hole 90 in cutting element 58, and helps to position cutting element 58 in recess 54. When cutting element 58 is to be removed from recess 54, removal pin 92 is rotated such that collar 98 provides a force in the z direction to force cutting element 58 out of recess 54, thus allowing the cutting element 58 to be removed from the milling head 52 without the need for prying and without the use of special tools.

In an alternative embodiment, cutting element 58 is secured within recess 54 by a standard threaded fastener 102, as shown in phantom in FIG. 3. In this embodiment, removal pin 92 is replaced by standard threaded fastener 102. The standard threaded fastener 102 extends through hole 90 in cutting element 58 and is received within threaded hole 100 in milling head 52. Tightening of the standard threaded fastener 102 retains cutting element 58 within recess 54. Thus, in this embodiment, standard threaded fastener 102 may be used to replace locking pin 92, locking wedge 70, and threaded fastener 82. Also, in this embodiment, slot 72 and hole 84 may be eliminated.

Referring still to FIGS. 2 and 3, the walls 66 and 68 formed in milling head 52 by recess 54 are configured to correctly position the cutting element 58 relative to the milling head 52, without the need to measure the position of the cutting surface 60. Side 62 of the cutting element 58 rests on wall 66, and side 64 of the cutting element 58 rests on adjacent wall 68. The depth d of the recess dictates the height of walls 66 and 68. In the embodiment shown, the depth d is greater than the thickness t of the cutting elements 58 (FIG. 5); however, the depth d of the recess, and the height of walls 66 and 68, may be of any height sufficient to prevent movement of the cutting element 58 relative to the milling head 52.

Walls 66 and 68 are positioned to ensure that, when cutting element 58 is installed contacting walls 66 and 68, the cutting element 58 has the proper cutting height and rake angle. Referring to FIG. 5, the cutting height b is the distance that the cutting element 58 extends into center hole 56. Referring to FIG. 6, rake angle ω is the angle, in a plane normal to the axis of rotation 57 (e.g. the x-y plane shown), between a line extending along the cutting surface 60 and line extending from the axis of rotation 57 to the tip of the cutting surface 60. In the embodiment of FIG. 2, the rake angle is 0°.

Figure 7:
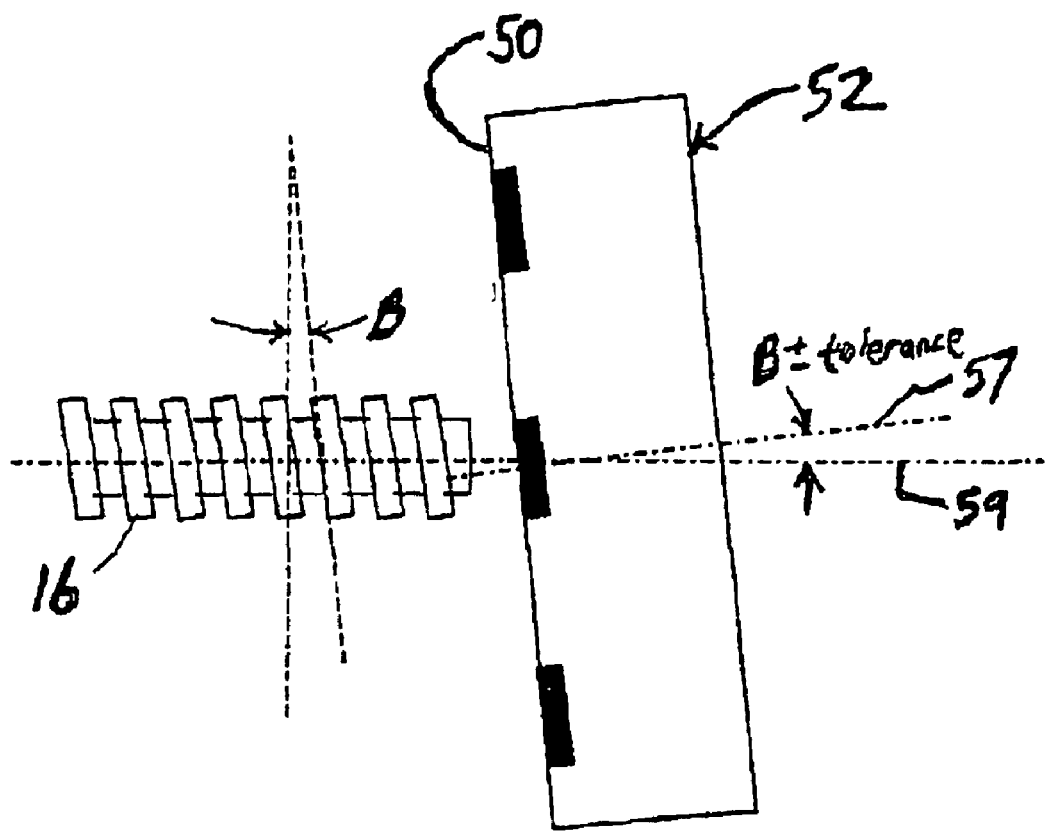
FIG. 7 shows the alignment of the milling head with respect to the work piece.

Referring to FIG. 7, alignment of the milling head 52 with respect to the work piece 16 is shown. The face 50 of the milling head 52, which extends in a plane normal to the rotational axis 57 of the milling head 52, is set within a predetermined tolerance to the desired lead angle β of the thread to be machined on work piece 16. Because of the clearance angles θ formed on the trailing side surfaces 200 of the cutting elements 58, the cutting elements 58 allow the predetermined tolerance to be greater than that possible with cutting elements of the prior art. In cutting elements of the prior art, the milling head must be set within fractions of a degree of the desired lead angle β to ensure that the trailing sides of the cutting element do not rub against the thread being formed. Such rubbing can cause inclusions and other imperfections in the thread. The clearance angles θ in the cutting elements 58 prevent the trailing sides of the cutting element 58 from rubbing against the threads being formed on the work piece 16 and, thus, allow the predetermined tolerance to be greater than that possible with prior art cutting elements. With the cutting elements 58, the milling head 52 can be set within one or more degrees of the desired lead angle β and still provide an acceptable thread on work piece 16.

The clearance angle θ formed on the trailing top surface 204 of the cutting elements 58 also allows the cutting elements 58 to be set at an increased range of rake angles ω. In cutting elements of the prior art, the cutting elements must be set to a precise, closed rake angle ω to ensure that the trailing top edge of the cutting element does not rub against the thread being formed. A closed rake angle is one in which the cutting surface faces away from the rotational axis of the milling head. The clearance angle θ in the cutting elements 58 prevent the trailing top surface 204 of the cutting element 58 from rubbing against the threads being formed on the work piece 16 and, thus, allow the face 60 of the cutting element 58 to be positioned at a relatively wide range of rake angles ω. Advantageously, the cutting elements 58 can be set to a neutral (0) rake angle ω, which provides for more efficient cutting while still providing an acceptable thread on work piece 16.

Because the cutting elements 58 are correctly aligned relative to the milling head 52, the correct alignment of the cutting elements 58 with the work piece 16 is ensured and the likelihood of defects in the resulting threaded part is greatly reduced. In fact, the milling head 52 has been shown to produce threaded parts with less faceting than prior art milling heads employing circular cutting elements, even when efforts have been made to properly align the circular cutting elements in the milling head.

In the embodiments of FIGS. 2 and 3, milling head 52 is shown as a generally cylindrical structure with conical center hole 56, extending through the milling head 52. Also extending through the milling head 52 are mounting holes 104, which are configured to receive mounting bolts (not shown) for mounting the milling head 52 to a lathe-milling machine or dedicated thread whirling machine. It will be appreciated that milling head 52 may be of any configuration and may use any means of connection that is convenient for a particular lathe-milling machine or dedicated thread whirling machine.

Figure 8:
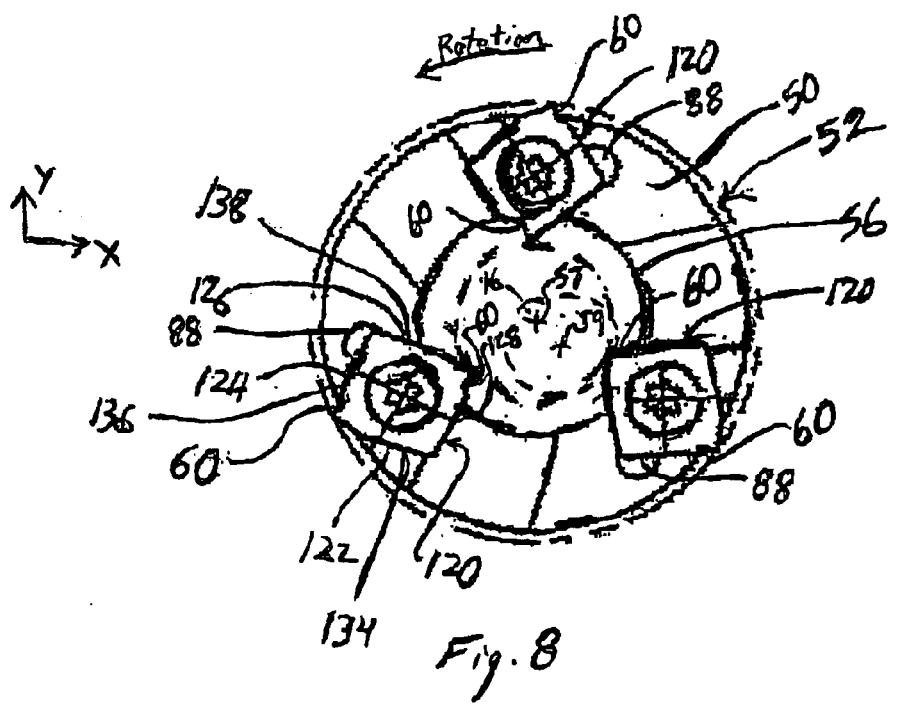
FIG. 8 is a plan view of an alternative face of a milling head including square cutting elements.

Referring to FIG. 8, milling head 52 is shown including square shaped cutting elements 120 disposed on face 50. Each of the cutting elements 120 includes four sides 122, 124, 126 and 128 and two cutting surfaces 60. Each of the cutting elements 120 also includes a hole 80 disposed in a center thereof for receiving threaded fastener 102, which secures cutting element 120 to milling head 52. As in the previous embodiment, in each cutting element 52, sides of each cutting element 120 contact walls 134, 136 and 138 formed by a corresponding recess in face 50. Walls 134, 136 and 138 are configured to correctly position the cutting element 120 with respect to the milling head 52. Also as in the previous embodiment, the cutting element 120 is symmetrical with respect to each of its cutting surfaces 60, thus allowing the cutting element 120 to be mounted to utilize any of the cutting surfaces 60 when one should wear out. For example, when the cutting surface 60 on side 128 wears out, the cutting surface 60 on side 124 can be rotated to extend into center hole 56 and perform the cutting operation on the work-piece 16. Cutting surfaces 60 may each include clearance angles θ, as previously described.

Referring to FIG. 9, milling head 52 is shown including additional cutting elements 150 for removing excess material from the work-piece 16. Three cutting elements 58 remove material from work-piece 16 to produce the thread form (e.g., the root and crest diameters 152, 154 of the thread as shown in FIG. 9). Three smaller cutting elements 150 are used to remove excess material from the work-piece 16 (e.g., the material between the outside diameter 156 to the crest diameter 154 as shown in FIG. 9). The smaller cutting elements 150 may be identical in design to the larger cutting elements 58, except for the relatively small dimensions. Both the larger and smaller cutting elements 58 and 150 are disposed in recesses 54, as described above with reference to FIGS. 2 and 3, to ensure that the cutting elements 58 and 150 will be correctly positioned with respect to the milling head 52. One or more cutting surfaces 60 are disposed on each cutting element 58 and 150, and may each include clearance angles θ, as previously described.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A milling head for thread whirling, the milling head including:

a plurality of thread cutting elements evenly disposed around a center hole, each thread cutting element in the plurality of thread cutting elements including at least two cutting surfaces formed thereon, any one of the at least two cutting surfaces being selectable to extend within the center hole for contacting a work-piece to produce a thread form on the work-piece;

wherein each thread cutting element in the plurality of thread cutting elements is aligned in a predetermined relationship with respect to the milling head by at least two walls contacting sides of the thread cutting element; and wherein the at least two walls are formed by a recess disposed in the milling head, each thread cutting element is secured within the recess by a locking wedge, the locking wedge being disposed in a slot contiguous with the recess.

2. The milling head of claim 1, wherein the predetermined relationship includes a cutting height and a rake angle.

3. The milling head of claim 1, wherein each thread cutting element is secured within the recess by a threaded fastener extending through a hole disposed in the thread cutting element.

4. The milling head of claim 1, further comprising:

a removal pin threadably disposed in a hole in the milling head beneath the thread cutting element, rotation of the removal pin forces the thread cutting element away from the milling head.

5. The milling head of claim 1, wherein the thread cutting elements are triangular in shape.

6. The milling head of claim 5, wherein three sides of each thread cutting element include a cutting surface formed thereon.

7. The milling head of claim 1, wherein the thread cutting elements are square in shape.

8. The milling head of claim 7, wherein two sides of each cutting element include a cutting surface formed thereon.

9. The milling head of claim 1, wherein each of the cutting surfaces include trailing side surfaces adjacent thereto, at least one of the trailing side surfaces extends from the cutting surface at a clearance angle relative to the cutting surface.

10. The milling head of claim 1, wherein each of the cutting surfaces include a trailing top surface adjacent thereto, the trailing top surface extends from the cutting surface at a clearance angle relative to the cutting surface.

11. A milling head for thread whirling, the milling head including:

a plurality of thread cutting elements evenly disposed around a center hole, each thread cutting element in the plurality of thread cutting elements including at least two cutting surfaces formed thereon, any one of the at least two cutting surfaces being selectable to extend within the center hole for contacting a work-piece to produce a thread form on the work-piece;

wherein each thread cutting element in the plurality of thread cutting elements is aligned in a predetermined relationship with respect to the milling head by at least two walls contacting sides of the thread cutting element;

wherein the at least two walls are formed by a recess disposed in the milling head, each thread cutting element is secured within the recess by a locking wedge, the locking wedge being disposed in a slot contiguous with the recess; and wherein the locking wedge is secured to the milling head by a threaded fastener, the threaded fastener including opposing thread directions on opposite ends thereof, rotation of the threaded fastener in a first direction forces the locking wedge toward the milling head, and rotation of the threaded fastener in a second direction opposite the first direction forces the locking wedge away from the milling head.

12. A milling head for thread whirling, the milling head including:

a plurality of thread cutting elements evenly disposed around a center hole, each thread cutting element in the plurality of thread cutting elements including at least two cutting surfaces formed thereon, any one of the at least two cutting surfaces being selectable to extend within the center hole for contacting a work-piece to produce a thread form on the work-piece;

wherein the plurality of thread cutting elements include:

a first set of thread cutting elements evenly disposed around the center hole, the first set of thread cutting elements contacting the work-piece to produce a thread form on the work-piece, and a second set of thread cutting elements evenly disposed around the center hole, the second set of thread cutting elements contacting the work-piece to remove material proximate the outside diameter of the work-piece.

* * * * *